United States Patent [19]

Hogl

[11] Patent Number: 6,081,199
[45] Date of Patent: Jun. 27, 2000

[54] LOCKING DEVICE FOR SYSTEMS ACCESS TO WHICH IS TIME-RESTRICTED

[76] Inventor: Christian Hogl, Klenzestr, 52 a, D-80469 Munich, Germany

[21] Appl. No.: 08/983,519

[22] PCT Filed: Jul. 30, 1996

[86] PCT No.: PCT/DE96/01415

§ 371 Date: Jan. 30, 1998

§ 102(e) Date: Jan. 30, 1998

[87] PCT Pub. No.: WO97/05579

PCT Pub. Date: Feb. 13, 1997

[51] Int. Cl.[7] .............................. G06F 7/04; E05B 49/00
[52] U.S. Cl. ...................... 340/825.31; 70/278.1
[58] Field of Search ........................ 340/825.31, 825.32; 70/278.1

[56] References Cited

U.S. PATENT DOCUMENTS 4,914,732   4/1990   Henderson et al. ............... 340/825.31

FOREIGN PATENT DOCUMENTS

| 20 58 623 | 6/1971 | Germany . |
| 24 01 602 | 7/1974 | Germany . |
| 27 35 048 | 2/1979 | Germany . |
| 30 31 405 | 4/1982 | Germany . |
| 43 01 039 | 7/1994 | Germany . |
| 43 25 137 | 2/1995 | Germany . |

*Primary Examiner*—Michael Horabik
*Assistant Examiner*—Kevin C. Harper
*Attorney, Agent, or Firm*—Foley & Lardner

[57] ABSTRACT

The present invention relates to a locking device 2 for objects of use, which are to be used for a particular period of time by a user, whereby the locking device 2 opens after the input of an opening code 4. The locking device is distinguished in that after input of an end code 6 the locking device issues a confirmation code (8) and changes the opening code in a particular manner (4→4'). Further, the invention relates to a method for the controlled, time-restricted, use of objects of use, which employs the locking device 2. In this method, an opening code 4 is issued by an access control unit 1, the opening code 4 is input into the locking device 2 for opening the same, an end code 6 is input for ending the use and then a confirmation code 8 is issued, the opening code being altered (4→4') by means of the locking device 2.

31 Claims, 1 Drawing Sheet

LOCKING DEVICE FOR SYSTEMS ACCESS TO WHICH IS TIME-RESTRICTED

BACKGROUND OF THE INVENTION

The invention relates to a locking device for objects of use, to be used for a restricted period of time, and a method for the controlled use of the objects of use.

Electronic access authorization systems offer, in comparison with mechanical locking systems, a much higher degree of flexibility in the individual issue and withdrawal of access authorizations.

Many different forms of such electronic access authorization systems are known which employ differing communications procedures and identification means, these includes for example cards, magnetic cards, chip cards, processor chip cards, transponders and the like, whereby the data exchange takes place via electrical contacts, electromagnetic or infrared signals and the like. Further, there are known combination locks which are operated by the entry of codes via a key pad and which employ particular protocols and algorithms for control and reprogramming.

The principle of code switching, which brings about an increase in security against improper information monitoring (bugging) is found in a series of publications such as e.g. DE 27 35 048 C2 or DE 43 25 137 A1. However, these systems are based upon the employment of intelligent keys, equipped with memories.

DE 30 31 405 and a series of similar systems, which are based upon sophisticated code conversion methods, involve storage of access authorization relationships in the lock or in a key.

With all such systems it is disadvantageous that the checking of the access authorization of the user takes place directly and locally in the lock itself, so that the access authorization information must be stored in the lock and/or in the key. This brings about the following problems:

The loss of a key means that there is a risk of misuse for all locks which the key fits. In the case of loss, these locks must all be so reprogrammed, at their locations, that the lost key is in future rejected.

The same applies to key-less systems which work only with the input of codes via a keyboard, in the case that a code becomes known or is detected by improper monitoring (bugging).

It is further disadvantageous that the programmed access authorization relationship can be checked or changed only with difficulty, because all locks concerned and/or keys must be checked and reprogrammed. The effort involved thus increases rapidly with increasing complexity of the access authorization relationship between users or keys or codes and locks, and requires a high level of organisation.

In DE 20 58 623 there is described a device which overcomes the above-mentioned disadvantages in that the access relationship is administered in a central access control unit, whereby, however, a cabling the locks with the access control unit is necessary, which is of disadvantageous.

In DE 24 01 602 C2, which is most closely related to the invention set out here and which likewise employs a central code issuing device and decentral locking devices, the significant disadvantage of a need for cabling is removed. There is described a method for the alteration of lock combinations specifically for use in hotels, which is based upon the fact that the end code of a cycle n is the same as the opening code of the cycle n+1, so that the first input of a new code deactivates the old code.

With regard to employment in a hire system, it is however disadvantageous with this system that the end of the cycle of use cannot be determined by the current user but only occurs with the beginning of the next cycle of use; that is, is initiated by the next user. This means, inter alia, that the current user cannot prove that his current cycle of use has ended. This, however, excludes employment in a hire system. It is further disadvantageous with this system that problems can appear when the code issuing unit and a locking device "get out of step"; that is, are no longer synchronized.

In DE 43 01 039 C2 there is described a method for the release of vehicles for a particular user, dependent upon a reservation. This, however, requires high technical outlay (cordless telephone) in relation to the object of the use, and fixed parking places in the vicinity of hire stations.

SUMMARY OF THE INVENTION

One object of the invention is to make available a locking device for objects of use, which are to be used for a particular period of time by a user, which avoids the disadvantages of the described locking devices.

A further object is to make available a method by means of which the controlled, time-restricted use of objects of use is made possible.

In accordance with the invention, this object is achieved by a locking device for objects of use, which are to be used for a particular period of time by a use, whereby the locking device opens after the input of an opening code. After input of an end code, the locking device issues a confirmation code and changes the opening code in a particular manner. Further, in accordance with a method for controlled, time-restricted use of objects, an opening code is issued by an access control unit into the locking device, and an end code is input for ending the use. A confirmation code is then issued, and the opening code is changed.

Further features and advantages can be understood from the following description.

BRIEF DESCRIPTION OF THE DRAWING

Below, the locking device in accordance with the invention will be described with reference to an exemplary embodiment and with reference to the drawing, which illustrates a locking device in accordance with one embodiment of the invention.

DETAILED DESCRIPTION

Figure 1:
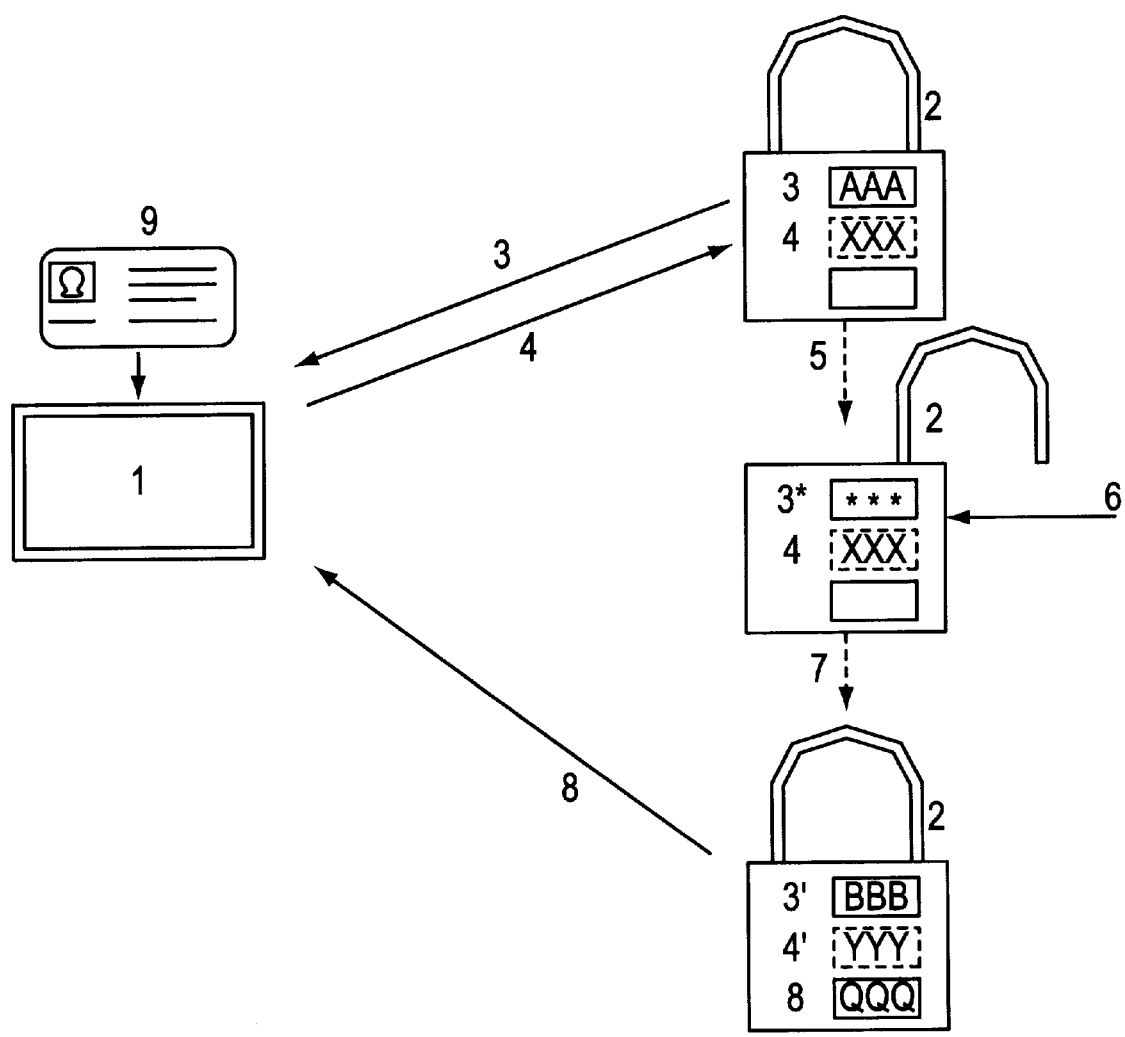

A locking system consisting of one or more locking devices 2 and one or more central access control units 1 is illustrated in the drawing.

The locking device 2 works with four codes, namely a code request code 3, an opening code 4, an end code 6 and a confirmation code 8.

The codes are entirely or partially variable in such a manner that they change completely or partially with each cycle of use. This principle is known as code switching.

Each cycle of use extends from the first opening by means of the first input of the opening code 4 up to the final locking through the input of the end code 6.

The code switching protocol is secret and known only to the locking device and the access control unit. Between the codes there may partially be a secret relationship such that in fact only one of the codes is altered in accordance with the code switching protocol and the other codes are consequently partially adapted so that they again satisfy the secret relationship.

The codes and the code switching protocol thereby have the property that, even when observed over many cycles of use, a relationship between the codes of a user cycle amongst one another or between the codes of successive user cycles cannot be determined or can only be determined with very great effort. The code switching protocol or the relationship between the codes one to another is thereby, ideally, different for each locking device, so that breaking of the code can only cause limited consequential damage.

The code request code 3 consists, in the simplest case, solely of a fixed object or locking device number. It need not be variable, but it can usefully be variable. It serves, so far as it is variable, on the one hand as information for a potential user, who with the object before him can determine therefrom whether this object is presently in use. On the other hand, it identifies the use cycle and use condition and communicates as initial input information to the access control unit 1 not only which locking device 2 is to be opened but also in which use cycle and condition this locking device is at present. This increases the reliability of the synchronization of the locking device 2 with the access control unit 1. The code request code 3 can, moreover, include additional data concerning the condition of the object of use, such as e.g. an initial counter value or the like. This additional data should thereby be encrypted, as protection against manipulation, or be secured by means of an encrypted check sum.

The opening code 4 corresponds to a temporarily valid key and controls the opening of the lock; that is, the release for use of the object controlled by the locking device 2. When it is input, the lock opens and the object can be used. This applies exactly for the period of the current cycle of use; that is, if appropriate, for a plurality of opening procedures, whereby a temporary re-locking of the lock without code, e.g. by means of mechanical locking or a simple key signal, can take place. With the expiry of the use cycle, the opening code 4 loses its validity, due to the code switching. The opening code 4 may expediently contain additional information, originating from the access control unit 1, intended for the object of use, by means of which e.g. the number or the kind of use procedures for the object of use, or the period of use, can be restricted. This additional data also should thereby be encrypted, to protect against manipulation, or secured by means of an encrypted check sum.

The input of the end code 6 marks the end of a cycle of use. Upon input of this code, the lock device must either already be in the locked condition or it goes into the locked condition. The confirmation code 8 is issued and the code switching effected (4→4') An opening anew is then only possible given the request of the new opening code 4' from the access control unit. The end code 6 may consist solely of a simple signal, which indicates the end of the cycle of use. Expediently, however, this should only be actuable by the legitimate user; thus the end code 6 should only be accessible or known to this legitimate user. The end code 6 may thereby expediently stand in a simple relationship to the opening code 4, for example the opening code 4 in the reverse order or consist of an additional number and the opening code 4, or it can be equal to the opening code, but thereby only have its effect as end code 6 through actuation of an additional signal.

The confirmation code 8 is provided for the final input into the access control unit 1. In relation to the access control unit 1 it serves as proof of the ending of the use of the object of use controlled by the locking device 2, releasing the user from responsibility. This confirmation code is of significance in particular in the case of employment in hire systems. Also this confirmation code 8 can expediently include additional data, e.g. concerning the distance travelled or number and kind of employed functions of the object of use, which then can be evaluated or stored by the access control unit 1 for the purpose of billing. The billing may consist e.g. in the return of a previously made deposit, less the use fee. For this additional data also, securing by encryption or by means of an encrypted check sum is recommended.

The transfer of codes between access control unit 1 and locking device 2 may be effected by means of electromagnetic signals, such as e.g. infrared signals, entirely without involvement on the part of the user.

Equally possible is the employment of different kinds of carrier media for carrying the codes into the hands of the user. Conceivable as carrier mediums are magnetic cards, chip cards, processor chip cards, magnetic coded paper strips, paper strips with punched hole patterns or printed bar codes, modified infrared-signal-controlled automobile keys and the like.

In entirely or partially manual embodiments, the code transfer could be effected by means of simple reading from LCD displays and input via keypads.

In all variants, for bridging larger distances, the transfer of codes can be effected in part via a telephone line.

The proof of authorization of the user with regard to the access control unit 1 can be effected in accordance with a method known from the state of the art, e.g. via a magnetic card or a chip card or a processor chip card or a biometric procedure or an exchange of coded signals, e.g. by means of an infrared signal key module or by means of the simple input of a secret code via a keypad. The access control unit 1 can thereby exercise various functions. This extends from the simple receipt of a deposit with final return of a remainder amount, up to storing of all use procedures and billing by way of a bank account.

In the following the method in accordance with the invention for the controlled use of objects of use will be described with reference to an exemplary embodiment and with reference to the drawings:

The code request code 3, which may contain (encrypted) status data of the object of use, is taken from the object of use which is intended to be used, or from the locking device 2, and entered into the access control unit 1, whereby the locking device 2 to be opened and if appropriate its condition is identified. Additionally, with respect to the access control unit 1, it is determined (9) in accordance with a method corresponding to the state of the art whether the authorization for opening the locking device 2 identified by the code request code, and thus the authorization for use of the corresponding object of use, is confirmed and if appropriate that a deposit has been paid. In the case of a positive result of this check, the currently valid opening code 4 for the locking device 2, in which there may be contained also additional data for evaluation by the object of use and the control unit of the same, is issued.

This is entered into the locking device 2, whereupon the lock opens (5) and the object of use can be used. A temporary re-locking and re-opening with the opening code 4, e.g. in the case of vehicles, is possible during the use cycle. The code request code 3 can be modified for the duration of the use cycle in such a manner (3→3*) that for a user who comes across a locked object of use it is apparent that this object is already in use.

If the use is to be ended, the end code 6 is entered. This can expediently consist e.g. of the opening code 4 in combination with an additional signal. If necessary, the locking device then goes into a locked condition (7), insofar as it is not already in such a condition, issues the confirmation code 8 and so switches itself by means of the code switching that further use is possible only if another new opening code 4' is requested. The confirmation code 8 can again be entered into the access control unit 1, whereby the end of the use of the object of use can be determined, to release the user from further responsibility for the object of use, and if appropriate with the aid of additional (encrypted) data contained in the confirmation code 8 there can be effected a final billing, such as e.g. the return of a deposit or the like. The request code 3* can, thereby, be so modified (3*→3') that from this code it can be clearly determined on the one hand that a new use cycle has started and on the other hand the condition (not in use) can be clearly determined. This ensures the synchronization of the locking device 2 with the access control unit 1. Expediently, the new code request code 3' may be the same as the previous confirmation code 8.

The advantages of the invention are the following:

On the one hand, the user can himself determine the end of the use procedure, and on the other hand can prove that the use has ended. These are important prerequisites for a hire system, which the above-described devices and methods of the state of the art do not fulfil.

The synchronisation between locking device and access control unit is ensured by means of the employment of the code request code 3, which is not the case with the above-mentioned, known methods.

For the locking devices 2, of which a number are present, a cheap, less secure code input/output method can be chosen, e.g. a simple keypad and a simple LCD display, but in contrast there can be selected for the use authorization check 9, with regard to the access control unit 1, of which as a rule only one is present, a more complex, expensive method, such as e.g. a processor chip card.

The logic to be implemented in the multiply present lock devices 2 is very simple and consists in substance only of an opening code comparison and a code switching algorithm, which makes possible economical manufacture.

Security is high, because improper monitoring (bugging) of the communication with the locking device 2 can scarcely cause damage, since the information obtained becomes of no value with the ending of the use cycle. Since possibly employed keys (carrier mediums for code transfer) have only temporary validity, a loss of the same does not involve consequent greater damage or lock reprogramming, as is the case with systems having permanently valid keys.

An information connection between access control unit 1 and lock unit 2 does not need to be simultaneous and "online", but can make use of intermediate carrier media. This makes possible a spatial and temporal separation of the authorization check 9 from the locking procedure 5. Together with the employment of a telephone connection this allows e.g. a simple and cost saving bridging of distances of any size, between a central access control unit 1 and a plurality of arbitrarily located locking devices 2, as will be described in a later example.

The invention thus makes possible the setting up of a hire system which has the following possibilities and advantages:

complete automation, and therewith cost reduction and 24-hour operation;

decentral distribution of the hire stations or of the objects of use;

central, simple administration of frequently changing user authorization relationships;

processing of hire procedures without physical transfer of keys or documents.

In the following there will be described an example of employment of the invention:

An automated bicycle hire system is involved, with which there is made possible, for a registered group of users, access to a number of arbitrarily located bicycles in an area, at any time, whereby use data is to be detected for reasons of security and for the purpose of billing. Hiring out and return are effected by means of communication with a computer via telephone.

The locking device 2 consists in a bicycle lock which has the properties according to the invention: the input medium is a keypad, the output medium a e.g. six character LCD display. In the locked condition, the bicycle cannot be moved, which can be additionally ensured in that an appropriate alarm device in accordance with the state of the art is integrated which is activated upon locking. In the unlocked condition, the alarm device is deactivated and the bicycle can be moved and ridden.

The access control unit 1 consists in a computer system which is connected with telephone lines via conventional modems. The control and data input by a calling user is effected by means of multi-frequency dialling tones, which one can generate with most telephones via the telephone keys or with cheap, common auxiliary devices. Such computer systems are state of the art, e.g. in automatic telephone banking systems.

A cycle of use runs as follows:

The bicycles are, as agreed, deposited in the vicinity of telephone call boxes. The user locates such a deposited bicycle and wishes to use it. For this purpose he reads a bicycle number and, from the LCD display on the locked lock, a further number. The combination of these numbers constitutes the code request code 3. With this information he enters the telephone call box and calls the access control computer 1. This requests him to input his user number, his secret number (PIN) (9), and the combined code request code 3, consisting of the bicycle number and the number indicated on the lock. The user data is checked, the coded request code 3 compared, if appropriate, with the stored condition data of the bicycle concerned, the authorization for use of this bicycle is checked, the new hire condition stored and the multiple-character opening code 4 associated with this bicycle and the current use cycle is determined. This opening code 4 is then communicated to the user acoustically. The bicycle concerned is thereupon regarded, in accordance with contract, as hired by the user concerned. The user can now open the lock by input of the opening code 4 and then use the bicycle. During the use, he can close the lock at any time and again open it through renewed input of the opening code 4. The code request code 3 displayed on the LCD display is blanked during the use cycle and in its place an indication 3* displayed, which indicates to a potential subsequent user that this bicycle is already in use. At the end of the use, the user deposits the bicycle again, in accordance with the agreement, e.g. in the vicinity of a telephone call box. He closes the lock, presses a special end key and once again enters the opening code 4. The lock interprets the combination of end key and opening code 4 as the input of the end code 6. Thereupon it switches to a new use cycle and carries out the code switching (4→4') whereby the confirmation code 8 is displayed on the LCD display. This confirmation code 8 of the previous use cycle is at the same time the new code request code 3', which will be found by the next user. For the user, the confirmation code 8 serves, with regard to the access control computer 1, as proof that the use has ended. A continuing use with the old opening code 4 is, of course, not possible after the code switching. Thus, the user again enters the telephone call box, calls the access control computer 1, identifies himself to this computer and enters the confirmation code 8. The computer compares this with the stored, expected code, and in the case of correspondency the bicycle is registered as returned. The use data can thereby be stored for billing purposes. Further, it is also conceivable that the user will be asked to enter the location number of the telephone call box in which he is, so that the computer can determine the location of the bicycle concerned therefrom, with the aid of a corresponding directory. Further, the computer can offer an information function so configured that upon input of a present location by means of the telephone call box location number or the user's own telephone number, the location of the nearest bicycle is determined and given out.

The advantages of the described system with regard to manual systems are found in the temporal and spatial independence of hiring out and return. The advantages in comparison to existing automatic systems lie in the independence of the return location and the simple administration of the access authorizations by means of a central computer, and in simple billing and effective, complete control.

The procedure described in the above example can be applied to other fields of use.

Clearly, application for car sharing clubs, hire car fleets or company vehicle fleets is possible. In the following there will be described an exemplary embodiment for a car sharing club.

Each customer or club member has a special club key. This is constituted as follows: a mechanical key bit, identical for all club keys, mechanically unlocks the steering wheel locks of all vehicles, which locks all lock in the same manner. In the interior of the club key there is a microchip which releases the electronic immobilizer. An infrared interface serves for communication with the central locking system. This specification corresponds to the state of the art in new vehicles. Additionally, the key has a small keypad and a multi-frequency tone code transmitter, as is state of the art for hand transmitters for the remote control of telephone answering machines.

The vehicle use functions as follows: the user calls, from any telephone, the central reservations office. He activates the club key by means of the input of a key PIN. Authentication with regard to the access control unit 1 in the central reservations office is effected in that the customer holds the code transmitter of the club key to the mouthpiece and presses a special key. The club key transmits to the central reservations computer, by multi-frequency signal, an authentication code. After checking of access authorization, the opening code 4 is acoustically indicated to the user. The user enters this code via the key's keypad. The club key is now primed. Alternatively, the transfer of the opening code 4 from the reservations computer 1 to the club key could be effected by multi-frequency signalling. This would, however, require higher technical outlay for the club keys, many of which will be present. A securing of the transferred code against unauthorised monitoring (bugging) can be readily implemented by means of cryptographic means. Thus, e.g. it can be ensured that the opening code is valid only for a particular club key.

In the vehicle, the features of the invention can be implemented by means of software adaption in the central locking and immobilizer control unit: the central locking opens upon input of the currently valid opening code 4 by infrared signal. The immobilizer releases the ignition circuitry upon receipt of the currently valid opening code 4 from the club key microchip. Cryptographic securing methods (code switching, public-private key encryption), as are state of the art for communication between the club key and the central locking or immobilizer, can be integrated into the code exchange principle in accordance with the invention: within a user cycle the locking function acts for interim locking and re-opening in a conventional manner. The end of the use cycle is initiated by the user by means of pressing of a special end key on the club key. The end code 6 is transferred to the central locking system by infrared signal. The central locking system effects the code switching (4→4') and re-transmits the confirmation code 8.

Additionally, there is a clear possibility for the transfer of reservation and trip information. There may be contained in the opening code 4, or transferred with it, e.g. information about a maximum use period, the immobilizer blocking the ignition if this period is exceeded. There may be contained in the confirmation code 8, or transferred with this code, e.g. information about the distance travelled, exceeded maximum speeds or information concerning accidents, impacts or other irregularities delivered from an accident data recorder. A GPS satellite navigation system may determine the actual return location and transfer this in a manner secure from manipulation.

The confirmation code 8 and the transferred additional data are intermediately stored in the microchip of the club key. The return of the vehicle functions analogously to the hiring out. The customer calls the central reservations office and transfers via the multi-frequency code transmitter of the club key the intermediately stored confirmation code 8 and possibly also additional data, to the reservations computer. There, the data is evaluated and stored and the vehicle registered as returned.

The advantages of the described system are the following:

The greatest advantage is the absence of a need for central hiring stations. The vehicles can be left at arbitrary locations. This expands the circle of users, increases acceptance and reduces costs.

Advantageous in comparison with conventional manual hiring procedures is the removal of the labour-intense administrative effort for authorization checks, vehicle key issuing, registration, key return, data collection and data processing.

Advantageous with regard to the procedures widely practised in car sharing clubs is the removal of the significant security risk and the lack of control, which arise due to the employment of a central safe which contains the keys of all vehicles and to which all participants have a key. An additional advantage is the automatic, direct registration of trip data, which can be evaluated directly computer-aided. The inconvenient use of vehicle log books is not needed.

Advantageous for the user in comparison to competing systems is that he need not have a chip card and need not operate an on-board computer. For him, after the priming of the club key, the vehicle use functions as with a private vehicle. He opens the central locking, starts the ignition and drives away. Advantageous for the operator is the absence of investment in on-board computer hardware.

Advantageous in relation to credit card based automatic machine systems with key safes, is the simplified and speeded-up procedure involved. For the operator the in vestment and main tenance costs for automatic machines and key safes are not needed.

Advantages with respect to competing solutions on the basis of data connections via radio networks are cost savings for radio hardware and transmission fees, lack of dependence upon particular locations and security against system failure.

A further possible application for decentral objects of use is described in the last example. In a copy shop, a largely automated operation is to be made possible and high cost investments in additional hardware for billing purposes, in relation to the multiply present copying apparatuses, are to be avoided. One realisation of these requirements could be as follows:

Billing a nd money collection is effected by means of a central automatic machine, of which only one is present, which accepts a deposit and issues an opening code for a particular copying apparatus. The required functionality on the part of the apparatus can be integrated by means of a simple control software adaptation without mechanical modification, in the copying apparatus, in a cost effective manner. Cabling of the individual apparatuses with central counters is not necessary, and neither is the installation of coin-operated machines or card readers at the apparatuses. Through input of the opening code, the apparatus is set in function for a maximum number of copies and time, by means of additional data coded therewith. In the finally-obtained confirmation code, the actually used copies are coded in, from which the central unit, together with the time spent, calculates the fees and returns the remaining deposit.

What is claimed is:

1. In a system for the controlled, time-restricted use of objects of use with a locking device and an access control unit, a method comprising
   the access control unit (1) issuing an opening code (4),
   the locking device (2) receiving the opening code (4) to unlock an object of use controlled thereby,
   inputting an end code (6) into the locking device for ending use of the object, and
   the locking device outputting a confirmation code (8) and changing the opening code (4→4').

2. A method according to claim 1, further comprising inputting a code request code (3) from the locking device to the access control unit (1).

3. A method according to claim 2, wherein the confirmation code 8 of a first use cycle n is the same as a next code request code (3') of a next use cycle n+1.

4. A method according to claim 3, wherein additional data is contained in the opening code output from the access control unit.

5. A method according to claim 3, wherein additional data concerning the object of use is contained in the confirmation code and/or in the code request.

6. A method according to claim 2, further comprising checking use authorization (9) for the object of use with the access control unit (1).

7. A method according to claim 2, wherein the end code is related to the opening code in a defined manner.

8. A method according to claim 2, wherein additional data is contained in the opening code output from the access control unit.

9. A method according to claim 2, wherein additional data concerning the object of use is contained in the confirmation code and/or in the code request.

10. A method according to claim 1, further comprising checking use authorization (9) for the object of use with the access control unit (1).

11. A method according to claim 10, wherein the end code is related to the opening code in a defined manner.

12. A method according to claim 10, wherein the confirmation code 8 of the use cycle n is the same as the code request code of the use cycle n+1.

13. A method according to claim 10, wherein additional data is contained in the opening code output from the access control unit.

14. A method according to claim 10, wherein additional data concerning the object of use is contained in the confirmation code and/or in the code request.

15. A method according to claim 1, wherein the end code (6) is related to the opening code (4) in a defined manner.

16. A method according to claim 15, wherein the confirmation code 8 of the use cycle n is the same as the code request code of the use cycle n+1.

17. A method according to claim 15, wherein additional data is contained in the opening code output from the access control unit.

18. A method according to claim 15, wherein additional data concerning the object of use is contained in the confirmation code and/or in the code request.

19. A method according to claim 1, wherein additional data is contained in the opening code (4) output from the access control unit.

20. A method according to claim 19, wherein additional data concerning the object of use is contained in the confirmation code and/or in the code request.

21. A method according to claim 1, wherein additional data concerning the object of use is contained in the confirmation code (8) and/or in the code request code (3).

22. A locking device for objects of use, which are to be used for a particular period of time by a user, the locking device comprising:
   means for unlocking the locking device in response to an opening code; and
   means for altering the opening code and issuing a confirmation code in response to an end code, hereby the confirmation code serves as proof of the ending of the use;
   wherein the locking device issues a confirmation code and changes the opening code in response to an end code.

23. A locking device according to claim 22, wherein locking device further includes means for transferring data that corresponds to the opening code and the end code.

24. A locking device according to claim 23, wherein the means for transferring data is comprised of a keypad and display on the locking device.

25. A system for locking objects of use, which are to be used for a particular period of time by al user, comprising:
   a central access control unit; and
   at least one locking device;
   wherein the locking device provides a cycle of use in which a locking device provides a request code from which the central access control unit issues an opening code that enables the user to open the locking device; and in which the locking device provides a confirmation code upon receipt of an end code and changes the opening code.

26. A system according to claim 25, wherein the confirmation code is provided to the central access control unit to serve as proof of the end of use of an object controlled by the locking device.

27. A system according to claim 25, wherein the central access control unit determines whether the user is authorized to use an object controlled by the locking device upon receipt of the request code.

28. A system according to claim 25, wherein the end code is related to the opening code in a defined manner.

29. A system according to claim 25, wherein the confirmation code serves as the code request code for a next subsequent cycle of use.

30. A system according to claim 25, wherein the opening code includes additional data by which the number of uses of the object controlled by the locking device, the period of use of the object controlled by the locking device, or the type of use of the object controlled by the locking device, can be restricted.

31. A system according to claim 25, wherein the confirmation code and/or the request code includes additional data regarding the object controlled by the locking device.

* * * * *

UNITED STATES PATENT AND TRADEMARK OFFICE
CERTIFICATE OF CORRECTION

PATENT NO. : 6,081,199
DATED : June 27, 2000
INVENTOR(S) : Christian HOGL

It is certified that error appears in the above-identified patent and that said Letters Patent is hereby corrected as shown below:

Please note on the front cover of Patent, insert

--[30] Foreign Application Priority Data August 1, 1995,

[DE] 195 28 203--.

Signed and Sealed this

Seventeenth Day of April, 2001

*Attest:*

NICHOLAS P. GODICI

*Attesting Officer*     *Acting Director of the United States Patent and Trademark Office*